United States Patent Office 3,396,515
Patented Aug. 13, 1968

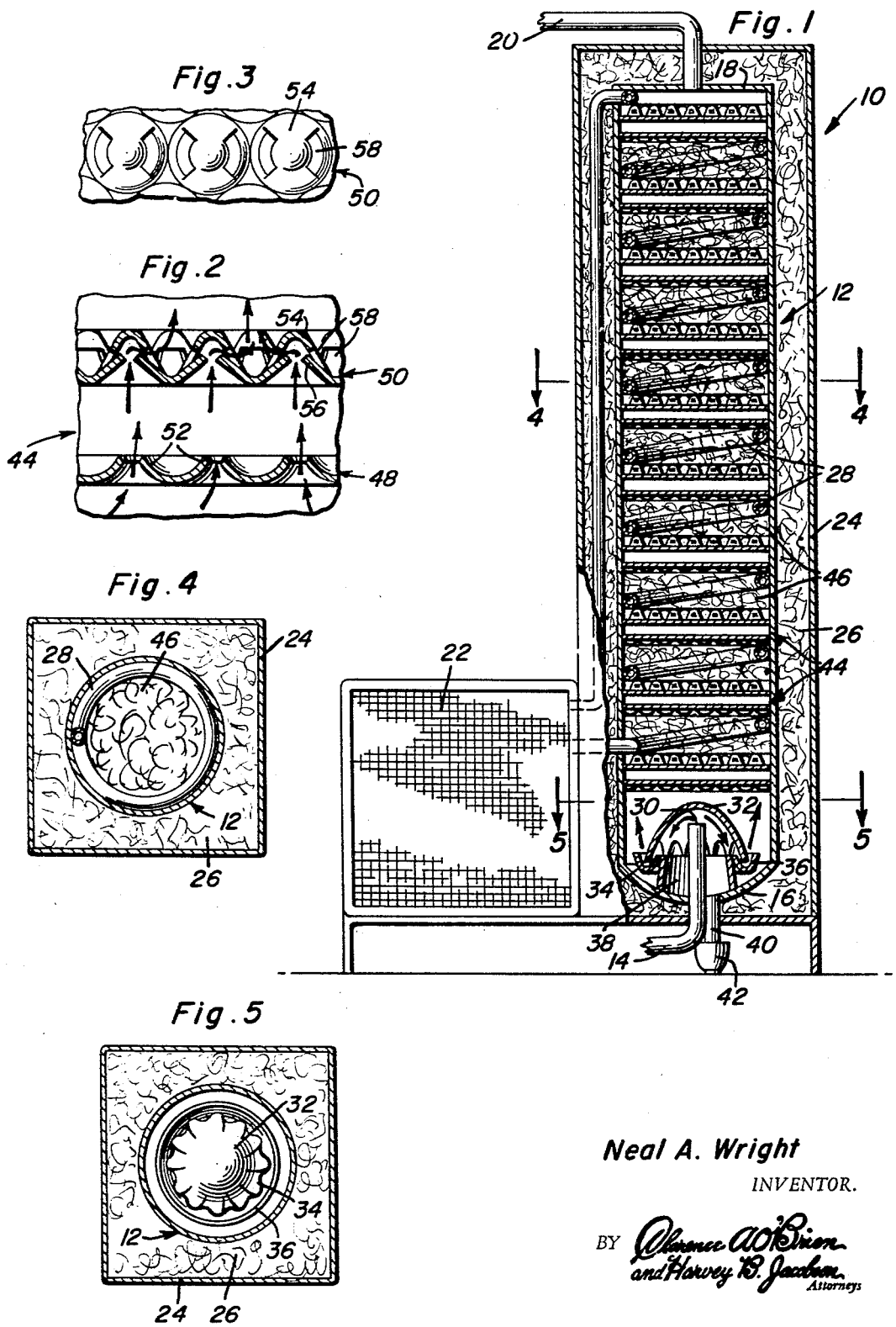

3,396,515
AIR DRYER
Neal A. Wright, 1346 10th Ave.,
Columbus, Ga. 31901
Filed Mar. 23, 1967, Ser. No. 625,379
2 Claims. (Cl. 55—269)

ABSTRACT OF THE DISCLOSURE

Apparatus for removing moisture, contaminants and the like from air wherein an elongated coil cooled tank is utilized in conjunction with a series of baffles, each of which incorporates cooperating baffle plates which selectively increase the air speed and direct the flow so as to in effect sling the moisture therefrom as the air progresses through the tank.

---

The instant invention is concerned with air purification, and more particularly relates to an air dryer through which compressed or pressurized air is directed, exiting free of contaminants such as water, scale, rust, oil and the like, as well as bacteria through the removal of the moisture which acts as a carrier therefor.

It is the primary object of the instant invention to provide air drying or purifying apparatus which is completely effective as a means for removing contaminants, and in particular moisture, whereby no subsequent purifying or drying action need be taken on the air discharged from the apparatus.

In conjunction with the above object, it is a particularly significant object of the instant invention to subject the air to a series of moisture discharging baffles positioned sequentially throughout the entire length of the condensing tank whereby a repeated contaminant discharging movement of the air is effected along the full length of its travel through the tank.

In conjunction with the above object, it is significant that the air, at each of the series of baffles provided throughout the tank, have the velocity thereof initially increased and the air subsequently directed along a flow path which tends to produce a significant flinging of the moisture from the air.

Furthermore, it is an important object of the instant invention to provide an air dryer which, in conjunction with providing for a complete removal of contaminants, is compact in nature and capable of being economically produced without detracting from the complete efficiency of the unit.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical cross-sectional view through the air drying apparatus comprising the instant invention, the refrigerant unit being shown adjacent thereto in elevation;

FIGURE 2 is an enlarged cross-sectional detail through one of the baffles, illustrating the associated upper and lower baffle plates;

FIGURE 3 is a plan view detailing a portion of the upper baffle plate;

FIGURE 4 is a cross-sectional view taken substantially on a plane passing along line 4—4 in FIGURE 1; and FIGURE 5 is a cross-sectional view taken substantially on a plane passing along line 5—5 in FIGURE 1.

Referring now more specifically to the drawings, reference numeral 10 is used to generally designate the air dryer comprising the instant invention. This apparatus 10 includes basically an elongated normally cylindrical condensating tank 12 through which the air to be dried or purified is passed. The air will enter through a first pipe 14 extending from a suitable compressor through the first sealed end 16 of the tank 12 and leave the second sealed end 18 through a suitable discharge pipe 20 in a dry and contaminant free state.

A suitable refrigerant unit 22 is mounted adjacent the tank 12, immediately outside the tank insulating housing 24, with fiber glass insulation 26 or the like being packed within the housing 24 about the tank 12. The refrigerant unit 22 is provided so as to, through an elongated loosely spiralling refrigerant or cooling coil 28 extending along substantially the full length of the interior of the tank 12, maintain the interior of the tank below dew point to thus provide for the desired condensation. As will be noted from FIGURE 1, the coil is introduced and exited from the tank at points adjacent the opposed ends 16 and 18 thereof.

The air inlet pipe 14 extends substantially longitudinally into the first end of the tank 16 on approximately the center line thereof. The open or discharge end 30 of this pipe 14 terminates in spaced relation to the apex of a domed diffusing plate 32 which in turn is provided with a fluted lower periphery 34 received within an upwardly directed annular trough 36. The trough 36 is affixed peripherally about the upper end of a chamber defining annular wall 38, the chamber having a centrally located drainpipe 40 extending therefrom. It is contemplated that this pipe 40 communicate with an automatic drain unit 42, in the nature of an automatic float type or an electric solenoid water valve, whereby the draining of the tank 12 is effected automatically and does not require a shut down of the entire apparatus. With regard to this draining, suitable apertures may be provided through the chamber defining wall 38 for a draining of the entire tank.

Returning again to the domed baffle plate 32, it will be appreciated that the fluted lower peripheral portion 34 thereof enables a spotwelding or the like of this baffle edge portion to the inner wall of the trough 36 so as to properly position the domed baffle thereover while at the same time retaining a plurality of peripheral passages through which the introduced and reversely directed air can flow. With reference to the lower portion of FIGURE 1, and the airflow arrows indicated thereon, it will be appreciated that the air discharged from the pipe 14 strikes the inner apex of the domed plate 32 and flows outwardly and downwardly along the inner surface of the plate 32 into the annular trough 36 through the aforementioned passages where the direction of the airflow is sharply reversed so as to flow vertically or longitudinally through the remainder of the tank 12. When flowing through the lower baffling unit defined by the plate 32 and trough 36, it will be appreciated that the entering air completely reverses directions twice. Further, inasmuch as the entire interior of the tank 12 is maintained well below the dew point, the air striking the plate 32 and following the tortuous path through the entry baffling unit, including the annular airflow reversing trough 36, will have a substantial portion of the moisture and contaminants condensed therefrom while at the same time diffusing the air so as to take advantage of the full cross-sectional area of the tank 12 as the air passes through the remainder thereof as the remaining contaminants are removed.

The extraction of any remaining moisture and contaminants is effected as the air passes through the remainder of the tank 12 by means of a series, preferably ten in number, of baffles or baffle units 44 in conjunction with a course of spun aluminum wool 46 packed between each pair of baffles 44 which acts as a filter for air entrained rust, scale and the like.

Noting FIGURES 2 and 3 in conjunction with FIGURE 1, attention is directed to the fact that each baffle or baffle unit 44 consists of a lower baffle plate 48 and an upper baffle plate 50 which cooperate in effecting an initial increase in the speed of the air and a rapid approximately 360° directional change in the flow so as to produce what might be considered an actual slinging of the moisture from the air. The plates 48 and 50 are positioned approximately ¾" apart with the lower plate 48 having a series of nozzles 52 of an upwardly decreasing cross-sectional area in the nature of a venturi whereby an immediate increase in the velocity of the air flowing therethrough will be effected. These nozzles 52 are of course provided throughout the entire extent of the plate 48. The upper plate 50, located less than an inch above the lower plate 48 has, throughout the entire extent thereof, a series of upwardly domed portions 54 having, in each instance, opposed inwardly struck flaps 56 which define lateral airflow openings 58 below the apex of each of the domed portions 54. Each of these openings 58 extend about approximately one quarter of the circumference of the domed portions 54 and may, in adjacent rows of domed portions 54, alternate 90° from each other. Thus, it will be appreciated that as the air moves through the baffle units 44, the velocity thereof is rapidly increased by the venturi type plate 48 with the increased velocity air being immediately introduced into the plate 50 containing the multiplicity of domed portions whereby the air, received within each domed portion 54, will have the direction thereof reversed approximately 180° for an exiting through the lateral openings 58, directed by the inwardly inclined struck-out portions 56, the exiting air subsequently being again directed along the longitudinal path through the tank 12. This rapid movement of the air into the domed portions 54 and the double reversal of the direction of the air thereby resulting in a highly effective slinging or centrifugal discharge of moisture therefrom with the course of aluminum wool immediately above each baffle 44 cooperating with the baffles in filtering out additional moisture in addition to rust, scale or the like, all of the baffle and wool course components of course being maintained below the dew point by the spiral refrigerant coil 28. Incidentally, it will be appreciated that each of the baffle plates has a suitable peripheral notch so as to allow for the accommodation of the continuous refrigerant coil 28.

In actual operation, the pressurized air is introduced into the lower end of the tank 12 from a suitable compressor through the pipe 14, this introduced air immediately engaging and being diffused by the lower diffusing baffle unit which, being chilled substantially below dew point, and through the airflow reversing nature thereof, acts so as to condense out a substantial portion of the moisture and other contaminants with which the air is laden. The air then, having been diffused across substantially the full cross-sectional area of the tank 12, passes through a series of baffles or baffle units 44 having interposed courses of aluminum wool. The individual baffles 44, normally ten such baffles being provided, effect, through a lower venturi plate, an initial increase in the velocity of the air, and through an upper centrifugal plate, a further condensing and slinging of the moisture from the rapidly flowing air. At the same time, the aluminum wool acts so as to filter out rust, scale and the like, this combined baffle and filter action being repeated throughout the length of the tank 12 resulting in a completely purified flow of exiting air. Incidently, it is of course appreciated that air filters or dryers utilizing various types of metal wool are known, however, the use of such wool in itself is ineffective for the purpose of removing any substantial portion of the moisture in the air, both because of the voids which naturally occur in the wool and because of the straight through passage of air. Thus, the unique baffles 44 introduced into the apparatus 10 of the instant invention perform a significant function in effecting the moisture removal.

It should be appreciated that the various materials utilized are to be of a relatively non-reactant nature, either through the nature of the material itself or through the provision of suitable protective coatings. For example, it is contemplated that the baffle plates be made of stainless steel while the tank itself is to have a moisture resistant coating. It should also be appreciated that the single gas, air, herein referred to, is only exemplary, with the apparatus of the instant invention being equally adaptable for use with various other types of appropriate gases from which contaminants can be condensed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Gas drying apparatus comprising a drying tank having opposed ends, a housing surrounding said tank, insulation within said housing about said tank, gas inlet means adjacent a first inlet end of said tank and gas outlet means adjacent the second outlet end of said tank for allowing a flow of gas through said tank, cooling coil means extending longitudinally through said tank, a refrigerant unit connected to said coil means for the circulation of a coolant therethrough, baffle means positioned within said tank between the opposed ends and within the flow path of gas moving through said tank, said baffle means including means for forming a tortuous path for the gas within the baffle means itself, a plurality of said baffle means comprising a series of baffle units at spaced points along said tank between the opposite ends thereof, a gas diffusing baffle in flow receiving association with said inlet means, said diffusing baffle comprising a domed plate overlying said inlet means in spaced relation thereabove for receiving incoming gas and effecting both a reversing and an outward directing of the gas flow across substantially the entire cross-section of the tank for movement therethrough, and flow reversing means associated with said domed plate for effecting a second reversing of the gas flow toward the outlet end of said tank, said flow reversing means comprising an annular trough surrounding the domed plate on the inlet side thereof, said trough overlapping the peripheral edge of said domed plate in spaced relation thereto for receiving gas flow from beneath said domed plate and directing this flow outward of the domed plate toward the outlet end of said tank, the peripheral edge portion of said domed plate including spaced laterally directed portions thereabout engaging and being fixed to said trough for a mounting of the domed plate thereon, wall means affixed to the trough and the adjacent inlet end of the tank for the support of the trough in spaced relation thereto, each of said baffle units comprising means for increasing the flow velocity immediately prior to entry of the gas flow into the associated tortuous path, the means for increasing the velocity of the flow comprising a plurality of venturi-type nozzles within the flow path, the means for forming a tortuous path comprising a plurality of domed portions overlying the plurality of nozzles associated with each baffle unit, said domed portions generally paralleling said nozzles in spaced relation thereto, said domed portions including closed gas flow reversing apex sections and peripheral openings immediately rearward thereof whereby the flow of gas will be received against the apex sections and reversed for discharge through the peripheral openings, the plurality of nozzles associated with each of the baffle units being integrally defined from a first plate, said domed portions associated with each baffle unit being integrally formed from a second plate positioned forward along the flow path from the nozzle plate, filtering material filling the space between the second plate of each baffle unit and the first plate of an adjacent baffle unit, a drain line communicated with and extending from the inlet end of the tank, and a flow control unit operatively connected to said drain line.

2. Gas drying apparatus comprising a drying tank having opposed ends, an insulated housing surrounding said tank, gas inlet means adjacent a first inlet end of said tank and gas outlet means adjacent a second end of said tank for effecting a flow of gas through said tank, a heat exchange assembly, said heat exchange assembly including a refrigerant unit and a coolant conduit means, said coolant conduit means extending longitudinally through said tank and being operatively connected to the refrigerant unit for the circulation of a coolant therethrough, a series of baffle units mounted in said tank at spaced points longitudinally therealong between the opposite ends thereof, each of said baffle units comprising first and second plates spaced longitudinally along the flow path of the gas, the first plate of each baffle unit incorporating means for effecting an increase in the flow velocity of the gas, the second plate of each baffle unit being positioned sufficiently close to the associated first plate so as to receive the flow of gas at an increased velocity, said second plate including means for effecting a reversing and lateral directing of the increased velocity flow prior to a continuation of the flow toward the second outlet end of the tank, the means for increasing the velocity of the flow comprising a plurality of venturi-type nozzles on the first plate of each baffle unit, the means for reversing and laterally directing the flow comprising a plurality of domed portions on the second plate of each baffle unit, said domed portions being in general alignment with said nozzles in spaced relation thereto and including closed gas flow reversing apex sections and peripheral openings immediately rearward thereof whereby the flow of gas will be received against the apex sections and reversed for discharge through the peripheral openings, filtering material filling the space within the tank between the second plate of each baffle unit and the first plate of the adjacent baffle unit along the flow path, a gas drying and diffusing baffle within said tank in flow receiving association with said inlet means, said diffusing baffle comprising a domed plate overlying said inlet means in spaced relation thereabove for receiving incoming gas and effecting both a reversing and an outward directing of the gas flow for a lateral spreading of the gas flow within the tank, and a flow reversing trough surrounding the domed plate on the inlet side thereof, said trough overlapping the peripheral edge of said domed plate in spaced relation thereto for receiving the gas flow from beneath the domed plate and directing this flow outward of the domed plate toward the outlet end of said tank, means rigidly positioning said domed plate and said trough in spaced flow permitting relation to each other above the gas inlet means, and drain means associated with the low point of said tank for the removal of moisture therefrom.

References Cited

UNITED STATES PATENTS

| | | | |
|---|---|---|---|
| 369,713 | 9/1887 | Hoppes. | |
| 791,773 | 6/1905 | Greenaway | 55—444 |
| 1,739,093 | 12/1929 | Ruby | 55—322 X |
| 1,741,519 | 12/1929 | Huff | 261—114 |
| 2,127,746 | 8/1938 | Logan. | |
| 2,143,015 | 1/1939 | Kleinschmidt | 261—114 X |
| 2,254,370 | 9/1941 | Kaplan | 261—114 |
| 2,261,057 | 10/1941 | Erwin | 55—442 X |
| 2,273,779 | 2/1942 | Dickey et al. | 55—320 X |
| 2,406,278 | 8/1946 | Worth. | |
| 2,703,519 | 3/1955 | Esselman et al. | 55—443 X |
| 3,075,337 | 1/1963 | Andreae | 55—521 X |
| 3,087,711 | 4/1963 | Glitsch. | |
| 3,192,691 | 7/1965 | Ely | 55—325 |
| 3,322,411 | 5/1967 | Moore | 261—96 |

FOREIGN PATENTS

| | | |
|---|---|---|
| 173,433 | 12/1952 | Austria. |
| 871,853 | 1/1942 | France. |
| 924,284 | 3/1947 | France. |
| 337,174 | 10/1930 | Great Britain. |

HARRY B. THORNTON, *Primary Examiner.*

D. TALBERT, *Assistant Examiner.*